United States Patent
Maier

(10) Patent No.: US 7,501,362 B2
(45) Date of Patent: Mar. 10, 2009

(54) NONWOVEN COMPOSITE ELEMENT

(75) Inventor: Walter Maier, Wachenheim (DE)

(73) Assignee: Quadrant Plastic Composites AG, Lenzburg (CH)

( * ) Notice: Subject to any disclaimer, the term of this patent is extended or adjusted under 35 U.S.C. 154(b) by 137 days.

(21) Appl. No.: 10/555,620

(22) PCT Filed: Mar. 24, 2004

(86) PCT No.: PCT/EP2004/003095

§ 371 (c)(1),
(2), (4) Date: Oct. 20, 2006

(87) PCT Pub. No.: WO2004/098879

PCT Pub. Date: Nov. 18, 2004

(65) Prior Publication Data

US 2007/0032159 A1    Feb. 8, 2007

(30) Foreign Application Priority Data

May 5, 2003 (DE) ................................. 103 19 967

(51) Int. Cl.
*B32B 27/12* (2006.01)
*B32B 27/32* (2006.01)
*D04H 1/46* (2006.01)

(52) U.S. Cl. ........................ 442/394; 442/398; 442/402

(58) Field of Classification Search ................. 442/394, 442/398, 402
See application file for complete search history.

(56) References Cited

U.S. PATENT DOCUMENTS

| 2002/0124936 A1 | 9/2002 | Loubinoux |
| 2004/0177911 A1 | 9/2004 | Dittmar |

FOREIGN PATENT DOCUMENTS

| DE | 36 14 533 C2 | 11/1987 |
| DE | 43 11 867 C2 | 10/1994 |
| DE | 100 52 693 A1 | 5/2001 |
| DE | 101 05 813 A1 | 8/2002 |
| DE | 101 60 442 A1 | 8/2002 |
| EP | 0 650 828 A1 | 5/1995 |
| EP | 1 055 759 B1 | 11/2000 |

OTHER PUBLICATIONS

English Abstract corres. to DE 100 52 693, May 3, 2001.
English Abstract corres. to EP 0 650 828, May 3, 1995.
English Abstract corres. to EP 1 055 759, Nov. 29, 2000.
English Abstract corres. to DE 43 11 867, Oct. 13, 1994.
English Abstract corres. to DE 101 05 813, Aug. 14, 2002.
English Abstract corres. to DE 36 14533, Nov. 5, 1987.
English Derwent Abstract corres. to DE 101 60 442, Aug. 29, 2002.
Abstract of Australian equivalent AU 2000066699 A1, Oct. 24, 2000.
Abstract of Australian equivalent AU-A-77583/94, Feb. 11, 1993.

*Primary Examiner*—Lynda Salvatore
(74) *Attorney, Agent, or Firm*—Brooks Kushman P.C.

(57) ABSTRACT

The invention relates to nonwoven composite elements in which a blended fiber nonwoven comprised of thermoplastic fibers and of reinforcing fibers having a high-melting point is joined on one or both sides to one or two composite films of the structure ba or bab, in which a is a thermoplastic material having a high-melting point and b is a thermoplastic material having a low-melting point, and layer b of the composite film(s) faces the blended fiber nonwoven.

9 Claims, No Drawings

NONWOVEN COMPOSITE ELEMENT

This invention relates to a nonwoven composite element containing a blended fiber nonwoven comprising thermoplastic fibers and reinforcing fibers, which is joined at one or both sides thereof to an adherent foil.

Blended fiber nonwovens according to the invention are non-consolidated semifinished products made from thermoplastic fibers and reinforcing fibers, which can converted to fiber-reinforced finished products, e.g. to automotive interior parts, by thermoplastic molding.

Such blended fiber nonwovens are described e.g. in DE-A 36 14 533, which relates to a method for producing compact molded articles from a fiber-reinforced thermoplastic material. The starting material is a blended fiber nonwoven comprising thermoplastic fibers, preferably polypropylene fibers or polyamide fibers and inorganic reinforcing fibers or natural fibers, that is compacted by needling. This blended nonwoven is pressed directly to form the finished part without prior consolidation, and further substrates, e.g. plastic foils, can be co-pressed. Blended fiber nonwovens are also described in DE-A 101 05 813, which relates to a method for producing a thermoplastically moldable, fiber-reinforced semifinished product. According thereto, thermoplastic fibers and reinforcing fibers are mixed to obtain a blended nonwoven, which is compacted by needling, then heated and pressed to a consolidated, thin semifinished product, optionally by co-pressing decor layers, e.g. thermoplastic foils.

For many application purposes, finished parts produced from polypropylene/glass fiber blended nonwovens are not sufficiently watertight and temperature resistant, so that they may be deformed in case of strong heat development; moreover, finished parts produced from polypropylene/natural fiber blended nonwovens are susceptible to mildew and frequently tend to emission of bad smell; thin finished parts produced from polyamide/glass fiber blended nonwovens are often not sufficiently bend-resistant. Therefore, the object of this invention is to modify the blended nonwovens in such a way that the finished parts produced therefrom do not have the above mentioned disadvantages.

This object is achieved according to present invention in that a blended fiber nonwoven of thermoplastic fibers and reinforcing fibers with a higher melting point are adherently joined at one or both sides thereof with a composite foil having the structure ba or bab, where a is a higher melting and b is a lower melting thermoplastic material, and where layer b of the composite foil faces the blended fiber nonwoven.

Blended fiber nonwovens comprising thermoplastic fibers and reinforcing fibers are basically known and are described in detail, for example, in the cited documents. The thermoplastic may be any spinnable thermoplastic material, preferably one that melts below 240° C. Particularly useful are polyolefins, particularly polypropylene, and polyamide 6. The reinforcing fibers must have a higher melting point than the thermoplastic fibers; in the case of polyamide 6, e.g. glass fibers and polyester fibers are useful; in the case of polypropylene, natural fibers, e.g. from flax, hemp, jute, sisal or kenaf are also suitable apart from glass fibers. In general, the fibers have a length of 40 to 100 mm, thermoplastic fibers and reinforcing fibers are mixed in a ratio of 80:20 to 20:80, preferably 70:30 to 30:70, e.g. by means of the crimping or air-laying methods, which are well known in the textile industry. In this process a blended fiber nonwoven is formed as an endless sheet that is subsequently compacted, preferably by needling. The thickness of the blended fiber nonwovens is preferably between 4 and 30 mm, particularly between more than 10 to less than 25 mm.

Depending of the application purpose, the blended fiber nonwoven A can be adherently joined at one or both sides thereof to a composite foil B. The latter can have the structure ba or bab, where a is a higher melting thermoplastic, preferably a polyamide, a polyester or a polyurethane, and b is a lower melting thermoplastic, preferably polyethylene or polypropylene. In general the composite foils have a thickness between 50 and 200 µm, particularly between 60 and 150 µm. Suitable composite foils are e.g. COVEXX and COMBITHERM foils supplied by Wipak.

The mixed nonwoven and the composite foil(s) are joined in such a way that the layer b of the composite foil(s) B faces the blended fiber nonwoven A. This is preferably achieved by continuously supplying the blended fiber nonwoven together with the composite foil(s) to pass by a heating source, e.g. to hot air or IR-radiation. The temperature of the hot air can be 300 to 400° C. However, the thermoplastic fibers of the blended fiber nonwoven and the lower melting thermoplastic of the composite foil are heated to above their melting point only for a short time, i.e. only for fractions of a second, so that they only soften but do not drip off; immediately thereafter they are then pressed together, e.g. by rolling. Such a method is described in detail in EP-A 1 055 759, wherein, however, blended fiber nonwovens are not joined to composite foils but rather to further thermoplastic nonwovens. At the same time a decor layer C that is also bound by the lower melting thermoplastic b can be co-pressed on one or both sides. Suitable decor layers are e.g. textile sheets, foam foils made of polyolefins or polyurethane, and thermoplastic foils which may optionally be dyed.

The nonwoven composite elements according to the present invention can be processed to finished parts in the same way as conventional blended nonwovens. For this purpose, they are heated to temperatures above the softening temperature of the thermoplastic fibers and pressed in suitable molds with pressures of 2 to 10 kp/cm$^2$.

The principal application fields for the nonwoven composite elements according to the present invention are automotive interior parts, e.g. interior door panels, hat racks, loading floors for luggage trunks and headliners. The latter consist of two layers of the composite element which is provided at both sides thereof with a composite foil of the structure bab, wherein the two layers are welded together only at a plurality of partial segments, and wherein there are non-welded segments between the layers, said non-welded segments containing air pads and having a convex upper layer. These headliners are produced by the method described in DE-A 101 60 442, although a loss of air is prevented by the airproof composite foil and not by a closed-cell foam foil. For automotive exteriors, the composite elements can be used to make engine encapsulations and underbody skidplates. Further application fields are suitcases and other containers, e.g. for computers. Whenever there is a risk that a finished part may soften and then bend upon strong heating, it is advisable to use blended fiber nonwovens on the basis of polyamide 6.

EXAMPLE

A 12 mm thickness needled blended fiber nonwoven of 60 wt % polypropylene fibers and 40 wt % of a mixture of natural fibers of flax, hemp and kenaf (NAF-COFORM supplied by Quadrant Natural Fiber Composites) was laminated at both sides thereof with a 90 µm thickness composite foil with the structure bab made of polyethylene and polyamide 6,6 (COVEXX supplied by Wipak) by applying the continuous thermobonding method according to EP-A 1 055 759. Pre-cut parts with a dimension of 80×120 were cut out of the resulting nonwoven composite element. These pre-cut parts were placed into a mold and pressed with a pressure of 3 kp/cm² so as to form interior door panels.

The invention claimed is:

1. A nonwoven composite element, containing
   A. a blended fiber nonwoven comprising thermoplastic fibers and higher melting reinforcing fibers, which is adherently joined at one or both sides thereof to
   B. one or two composite foils of a thermoplastic material, characterized in that the foil(s) B is a composite foil with the structure ba or bab, wherein a is a higher melting thermoplastic material, selected from a polyamide, a polyester and a polyurethane, and wherein b is a lower melting thermoplastic material, selected from polyethylene or polypropylene, and wherein layer b of the composite foil(s) faces the blended fiber nonwoven, and wherein the thickness of the composite foil(s) is between 50 and 200 μm.

2. Composite element according to claim 1, characterized in that the thermoplastic fibers of the blended fiber nonwoven A are polypropylene fibers and that the reinforcing fibers are glass fibers or natural fibers.

3. Composite element according to claim 1, characterized in that the thermoplastic fibers of the blended fiber nonwoven A are polyamide 6 fibers and that the reinforcing fibers are glass fibers or polyester fibers.

4. Composite element according to claim 1, characterized in that the weight ratio of thermoplastic fibers to reinforcing fibers is 80:20 to 20:80.

5. Composite element according to claim 1, characterized in that the blended fiber nonwoven is needled.

6. Composite element according to claim 1, characterized in that the thickness of the blended fiber nonwoven A is between 4 and 30 mm.

7. Method for producing the nonwoven composite element according to claim 1, characterized in that the blended fiber nonwoven A together with the composite foil(s) B are continuously supplied to a heating source and are pressed together immediately after heating.

8. Method according to claim 7, characterized in that during heating the temperature of the material is above the softening temperature of the thermoplastic fibers of the blended fiber nonwoven A and of the lower melting thermoplastic of the composite foil(s) B.

9. Underbody skidplates and automotive engine encapsulations, produced from composite elements according to claim 1, characterized in that the composite foils have the structure ba.

* * * * *